United States Patent [19]

Kluth

[11] 4,455,580

[45] Jun. 19, 1984

[54] VIDEO RECORDER

[75] Inventor: Hans-Jürgen Kluth, Garbsen, Fed. Rep. of Germany

[73] Assignee: Licentia Patent-Verwaltungs-GmbH, Frankfurt am Main, Fed. Rep. of Germany

[21] Appl. No.: 360,171

[22] Filed: Mar. 19, 1982

[30] Foreign Application Priority Data

Mar. 20, 1981 [DE] Fed. Rep. of Germany ....... 3110968

[51] Int. Cl.³ ......................... H04N 5/782; G11B 5/00
[52] U.S. Cl. ..................................... 360/19.1; 358/343
[58] Field of Search ................ 358/343, 341; 360/19.1

[56] References Cited

U.S. PATENT DOCUMENTS 3,830,968  8/1974  Redlich et al. .
3,839,731  10/1974  Gart et al. .
4,051,515  9/1977  Metzger et al. .
4,303,950  12/1981  Taniguchi et al. ................. 360/19.1

FOREIGN PATENT DOCUMENTS 1277900  5/1969  Fed. Rep. of Germany .
2201691  7/1973  Fed. Rep. of Germany .

OTHER PUBLICATIONS

Nakamura et al. "Simplified Time-Division Color Signal Multiplexing for Video Disc and VTR by Using a New Solid-State Memory" IEEE Transactions Feb. 1976, pp. 54 to 60.

J.-M.L. *Toute l'Electronique*, "Un Magnetoscope a Cassette Experimental: le (Fixed-Head VCR) de Toshiba" Jun. 1979, pp. 8 and 9.

*Primary Examiner*—Robert L. Richardson
*Attorney, Agent, or Firm*—Spencer & Frank

[57] ABSTRACT

In a video tape recorder for recording and/or playing back a picture carrier which has been angularly modulated with a video signal, the recorder including a rotating capstan drum having two electromagnetic transducer heads mounted to travel along oblique tracks on a magnetic tape and alternatingly scan the tape, both heads being active to scan the tape simultaneously in overlap zones along the drum, an audio carrier which has been frequency modulated with an audio signal is recorded together with the video signal along the oblique tracks, and the recorder is provided with a playback system including a picture signal path and an audio signal path, signal separating circuitry connected between the heads and the paths for conducting the picture carrier to the video signal path and the audio carrier signal to the audio signal path, and signal processing circuitry connected to the audio signal path for additively superposing the audio carrier signal portions provided by both heads, before the audio carrier is demodulated, while causing the audio carrier signal portions provided by one head to differ in amplitude from the audio carrier signal portions provided by the other head in such a manner that in the superposed signal the signal portions provided by one head always differ in amplitude from those provided by the other head.

9 Claims, 6 Drawing Figures

VIDEO RECORDER

BACKGROUND OF THE INVENTION

The present invention relates to video tape recorders of the type provided with two rotating heads and in which television signals are recorded along parallel tracks extending obliquely to the length of the tape.

It is known that in video tape recorders the video signal is recorded by frequency modulating a picture carrier and recording the modulated carrier along oblique tracks which extend obliquely at a predetermined angle, which is about 6° for VHS devices, to the longitudinal direction of the tape. Preferably one picture field, for example, is recorded along each such oblique track. Recording and playback are effected with rotating heads, there being two heads in the VHS system which are alternatingly in contact with the oblique tracks. In this way the relatively high relative speed between head and tape required for video recordings is achieved with a relatively slow tape advance.

In such devices, the audio signal is recorded by a stationary head on a longitudinal track having a width of about 1 mm and which extends parallel to the edge of the tape. The audio signal is played back by a similar stationary head. Thus, it is the relatively low longitudinal velocity of the tape, and not the substantially high relative speed between the rotating video signal heads and tape on the oblique tracks, which is a major factor in the recording and playback of the audio signal.

Recorders which are presently on the market can operate with values of the order of magnitude of 2 cm/s and less in order to increase the total playing time of the tape. This low relative speed between tape and audio head has a disadvantageous effect on the quality of the recorded audio signal. High fidelity sound quality is practically impossible to achieve with such a low relative speed. The recorded audio signal only has a frequency range of about 70 Hz to 10 kHz. Due to the narrow physical width of the longitudinal track, the associated signal to noise ratio is also relatively poor and becomes even worse if two audio signals are recorded for stereo playback or bilingual playback since the width of each channel is then of necessity half that of the longitudinal track.

It is conceivable to record the audio signal in a manner similar to that employed for video discs on the oblique tracks together with the picture carrier. However, such a solution has not yet been successfully reduced to practice. On the one hand, the available frequency band is already utilized completely. The range from 0–1.3 MHz is taken up by the reduced-frequency, quadrature modulated chrominance subcarrier and the rest of the frequency band is occupied by the frequency spectrum of the modulated picture carrier.

Recording of an audio, or sound, carrier in the remaining narrow frequency gap between the modulated chrominance subcarrier and the frequency spectrum of the picture carrier is practically impossible because of the required steep filter band edges for the chrominance subcarrier and picture carrier due to the occurring phase and group delay errors. On the other hand, if the audio signal is recorded on the oblique tracks there results considerable interference during playback due to the switching between video heads, which does not interfere with picture playback because it takes place during the vertical blanking periods.

During playback of the audio signal, however, this switching of heads becomes audible as an annoying noise component because the playback of the audio signal, which is modulated, for example, on a carrier, is temporarily interrupted due to the switching of heads or is subjected to phase shifts. The resulting spike-type interference pulses at a fundamental frequency of 50 Hz with a large harmonics content produce a continuous, annoying noise during audio playback.

SUMMARY OF THE INVENTION

It is an object of the present invention to record the audio signal on the oblique tracks with improved quality and without interference by the change of heads.

The above and other objects are achieved, according to the present invention, in a video tape recorder for recording and/or playing back a picture carrier which has been angularly modulated with a video signal, the recorder including a rotating capstan drum having two electromagnetic transducer heads mounted to travel along oblique tracks on a magnetic tape and alternatingly scan the tape, both heads being active to scan the tape simultaneously in overlap zones along the drum, and means for additionally recording an audio signal, by constructing recording means for recording an audio carrier signal composed of an audio carrier which has been frequency modulated with the audio signal together with the video signal along the oblique tracks, and further providing the recorder with a playback system including: means defining a picture signal path and an audio signal path; signal separating means connected between the heads and the paths for conducting the picture carrier to the video signal path and the audio carrier signal to the audio signal path; and signal processing means connected to the audio signal path for additively superposing the audio carrier signal portions provided by both heads, before the audio carrier is demodulated, while causing the audio carrier signal portions provided by one head to differ in amplitude from the audio carrier signal portions provided by the other head in such a manner that in the superposed signal the signal portions provided by the one head always differ in amplitude from those provided by the other head.

In the present invention, the high relative speed between the heads and the tape enables the available bandwidth for the picture signal to advantageously also be utilized for recording the audio signals on the oblique tracks. By recording the audio signals at high frequencies, high fidelity sound quality can be realized. A further advantage is that the previously required longitudinal track for recording the audio signal can be omitted. Thus, either an additional region of the magnetic tape can be utilized for recording the picture signal or this region can be utilized for some other purpose. In this way it is possible to either improve the quality of the video recording or to reduce tape width. A particularly good utilization of the magnetic tape can be realized if, as disclosed in German Offenlegungsschrift [Laid-Open Application] No. 3,011,635, the previously additionally used synchronizing track parallel to the tape edge to mark the oblique tracks is omitted and the signal which marks the individual oblique tracks as required to regulate the head is derived by utilizing the so-called azimuth angle. In this way a video recorder can be equipped only with rotating heads for recording the oblique tracks, i.e. without the additional recording heads for the longitudinal tracks such as, for example, for audio recording or for the sync track. The tape area thus made available makes it possible to increase the tape playing time by about 16% while retaining the same picture quality and the same tape length. That means, for a cassette intended for 4 hours of playing, achievement of an additional playing time of 40 minutes.

The recording of the audio signal in FM makes it possible to substantially compensate amplitude fluctuations in the recorded audio carrier by amplitude limiting. This type of modulation is also one of the bases of the solution to the problem to which the present invention is directed. The different gains in the two head output signals introduced for error removal is limited again during the frequency modulation.

One embodiment of the invention will now be explained in greater detail with the aid of the drawings.

DESCRIPTION OF THE PREFERRED EMBODIMENTS

Figure 1:
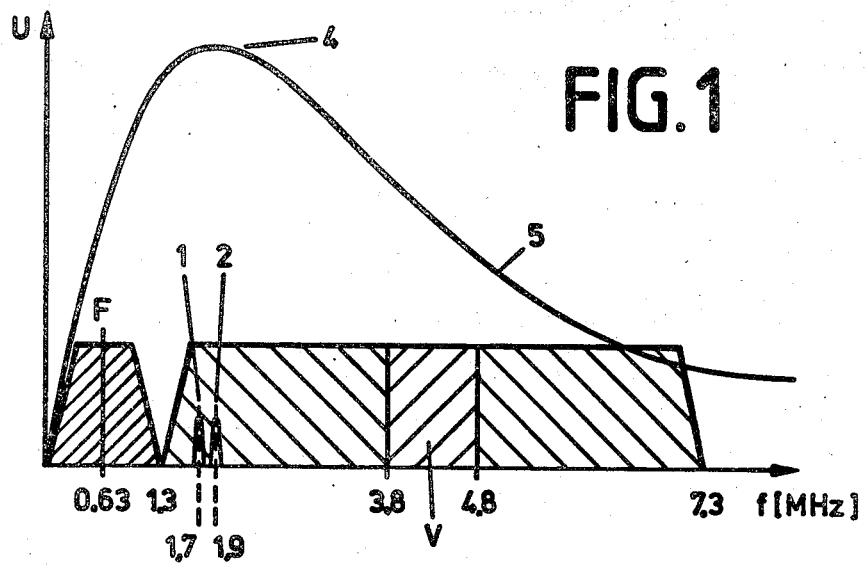
FIG. 1 is a diagram illustrating the frequency spectrum for recording the individual signals on the oblique tracks according to the invention.

FIG. 1 shows the spectrum of a recorder signal including, in the lower frequency range, a reduced-frequency, quadrature modulated chrominance subcarrier F at a frequency of 0.63 MHz and a bandwidth of about ±500 kHz. The video signal V is recorded by frequency modulation of a picture carrier. Its static modulation characteristic extends between the frequencies of 3.8 and 4.8 MHz, with 3.8 MHz corresponding to the value beyond black and 4.8 MHz corresponding to the white value of the video signal. The modulation results in a frequency spectrum of 1.3 to 7.3 MHz. As a result of the head gap, the upper sideband, above 6 MHz, is not scanned completely so that interference due to signal reflections is reduced.

Within this frequency spectrum, two audio carriers 1 and 2 are recorded, at the frequencies of 1.7 and 1.9 MHz, each carrier being frequency modulated with a low frequency audio signal. If a stereo signal having audio carriers spaced apart by 250 kHz is introduced at the transmitting end, the carriers 1 and 2 should also have a corresponding spacing (e.g. 1.65 and 1.9 MHz or 1.7 and 1.95 MHz) so as to simplify conversion. The two low frequency audio signals may represent a stereo signal or monaural signals in different languages.

The frequencies of the two audio carriers 1 and 2 lie approximately at the peak 4 of the head/tape frequency response characteristic 5 which is effective on the oblique tracks during recording of the entire signal. This is where there is the least interference between the picture signal and the audio signal because, with reference to the demodulated video signal, the higher frequency picture components occur in this range only during 10% of the transmission period. The frequencies decisive for image sharpness, however, remain unattenuated. At the same time, the video heads of all home video recorders are most sensitive in a range around 2 MHz so that the optimum signal to noise ratio location has been selected for audio playback. Thus, the interchangeability of video cassettes having weakly recorded audio carriers poses no problems within a cassette system.

Figure 2:
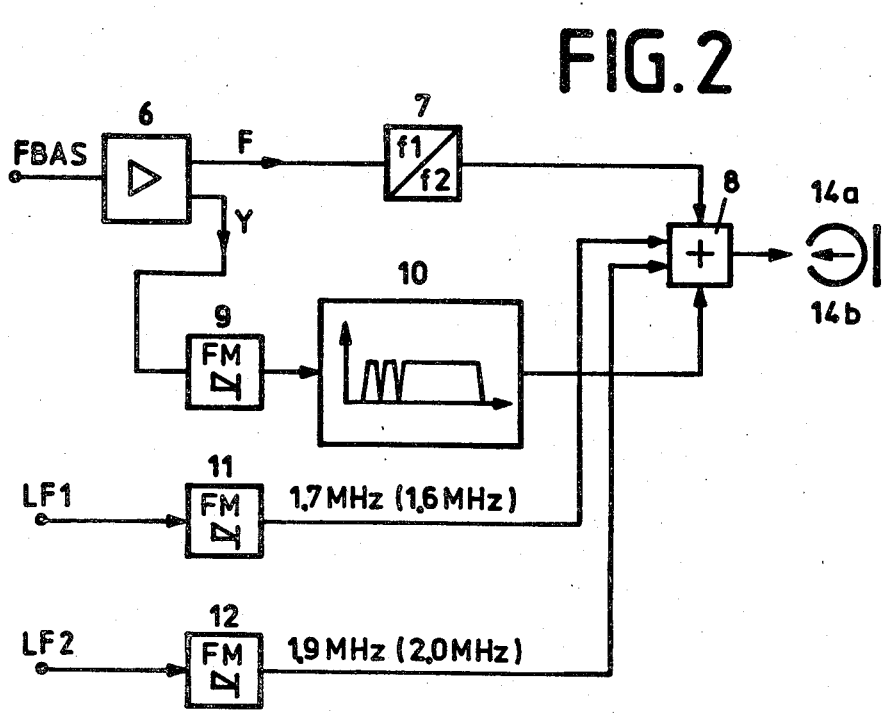
FIG. 2 is a block circuit diagram of a circuit for recording according to the invention.

In FIG. 2, an FBAS signal is separated by frequency selective means in a separation circuit 6 into the modulated chrominance subcarrier F and the luminance signal Y. The modulated PAL chrominance subcarrier F is converted in a frequency converter 7 from its original frequency of 4.43 MHz to the frequency of 0.63 MHz and the converted signal is fed to an adder stage 8. The luminance signal Y is modulated, in a frequency modulator 9, onto a picture carrier, thus producing a frequency spectrum from 1.3 to 7.3 MHz as shown in FIG. 1. Within this frequency spectrum, two conventional notch filters (not shown) in a filter circuit 10 suppress the frequencies in the frequency ranges around 1.7 and 1.9 MHz. The remaining signal is likewise fed to the adder stage 8.

Two audio signals LF1 and LF2 are modulated in two frequency modulators 11 and 12 onto two carriers having the carrier frequencies 1.7 and 1.9 MHz, and the modulated audio signals are likewise fed to the adder stage 8. For an audio frequency band of 15 KHz to be recorded, an FM frequency deviation of ±50 kHz is selected thus resulting in modulation frequency ranges of 1.7 or 1.9 MHz, respectively, ±65 kHz. In order to avoid interference in the Y signal by the two audio carriers, each of the above-mentioned notch filters in circuit 10 suppresses the frequencies associated with a respective audio carrier over a bandwidth of ±65 kHz.

The output signal of the adder stage 8 includes the signals shown in FIG. 1 and is alternatingly fed to successive ones of the magnetic heads 14a and 14b for recording on a magnetic tape. This signal mixture shown in FIG. 1 is then recorded on the oblique tracks of a magnetic tape.

Figure 3:
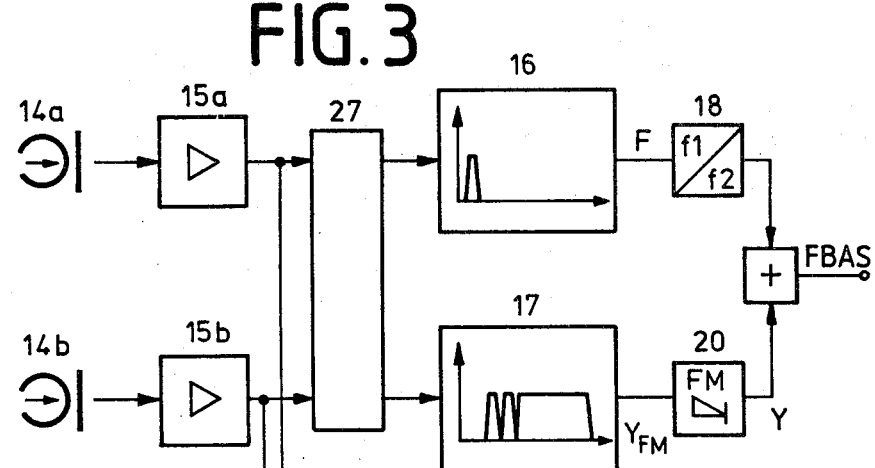
FIG. 3 is a block circuit diagram of a circuit for playback according to the invention.

In the playback system shown in FIG. 3, the signal mixture of FIG. 1 is alternatingly picked up by heads 14a and 14b, amplified in amplifier 15a or 15b, respectively, and is split by means of bandpass filters 16 and 17 into the modulated chrominance subcarrier F and the modulated picture carrier $Y_{FM}$. Since the change between heads 14a and 14b takes place during the time of the vertical blanking gap, no additional measures are required with respect to the video signals. However, it is of advantage to introduce during playback a hard electronic fade-out for the signal mixture furnished by heads 14a and 14b, as is provided in the commercially available devices, such as the Betamax, V 2000 VCR. For this purpose, a fade-out device 27, in the form of an electronic switch, is included between the amplifiers 15 and the filters 16, 17.

In a frequency converter 18, the chrominance subcarrier F is frequency converted back to the frequency of 4.43 MHz and fed to an adder stage 19. In filter 17 the frequency ranges around 1.7 and 1.9 MHz are suppressed by notch filters to prevent interference in the picture playback by the audio carriers. This makes it possible, under certain circumstances, to increase the amplitudes of the recorded audio carrier signals and thereby improve the signal to noise ratio. The slight reduction in picture sharpness caused thereby is practically nondiscernible because the suppressed regions are statistically of lesser significance. In a frequency demodulator 20, the luminance signal Y is recovered and fed to the adder stage 19.

Figure 4:
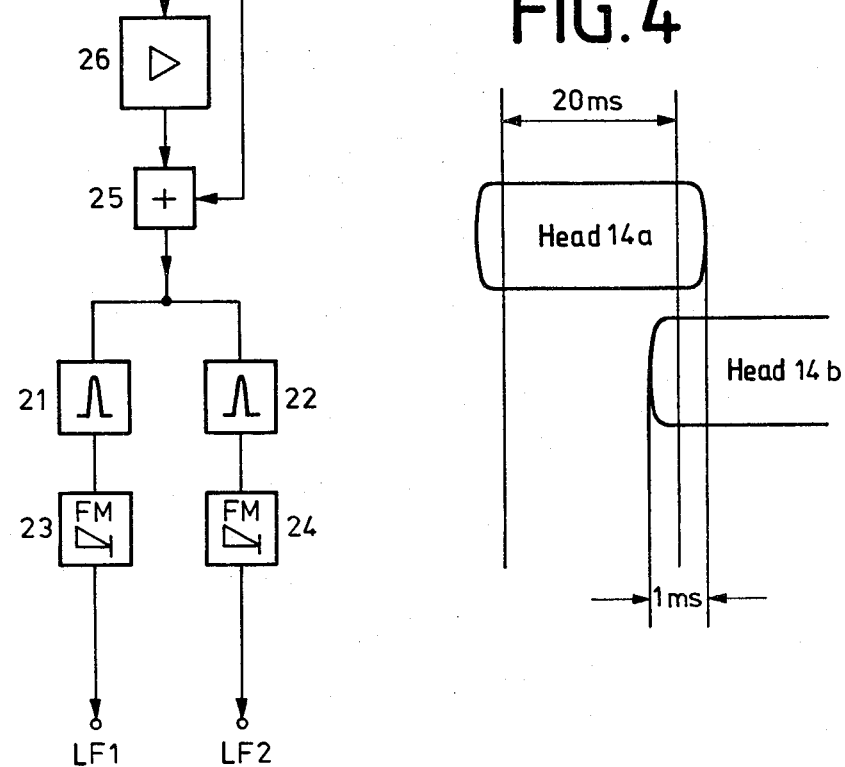
FIG. 4 is a diagram showing the signal segments furnished by the rotatable heads of a recorder.

The total signal mixture furnished by heads 14a and 14b has overlapping zones in which both heads 14a, 14b have contact with the tape and furnish output signals. FIG. 4 shows this overlapping of the signals furnished by heads 14a and 14b, with the switching points being marked. Because these overlap zones are subject to phase fluctuations, the signal components in these zones may be amplified or cancelled out during addition as both carrier packets are carefully set to the same amplitude due to the chrominance subcarrier information which is transmitted simultaneously in AM with reduced carrier. This cancelling out results in audio interference.

Before the total signal mixture furnished by heads 14a and 14b is fed to any circuit for linearizing the envelope curve of the video signal mixture furnished by the heads, or before it is fed to any device for hard electronic fade-out, this total signal mixture is branched off. Reverting to FIG. 3, the two modulated audio carriers are selectively separated from the signal mixture of FIG. 1 by means of respective narrowband filters 21 and 22 and are fed to correspondingly tuned frequency demodulatores 23 and 24. The demodulators furnish the two audio signals LF1 and LF2. These demodulators may be PLL types, which are also able to process signals which do not originate from highly stable transmitters but from home instruments equipped with economical audio modulatores, e.g. for processing original audio performances. One suitable PLL type demodulator could be a TBA 120S. One manufacturer of said IC is AEG-Telefunken in Germany/Heilbronn.

The total signal furnished by head 14a or amplifier 15a, before being fed to the filters 21 and 22 is fed into an adder stage 25. The total signal furnished by head 14b or by amplifier 15b, respectively, is fed to an amplifier 26 whose output signal is also fed to the adder stage 25. The output signal of the adder stage 25 now, in any case, is a signal which has an audio signal component even during the head switching phase so that the otherwise unavoidable 50 Hz interference cannot occur. The amplifier 26 has a gain factor of 2. Since then the two audio carriers 1 and 2 thus have respectively different amplitudes at the inputs of the adder stage 26, they are unable to cancel one another out even if they are in 180° phase opposition.

In practice, an embodiment has been tested in which the notch filter was a type of filter employed in commercially available color television receivers for the suppression of the chrominance subcarrier in the Y channel, which filter had been modified, i.e. converted to a different frequency and bandwidth.

Figure 5:
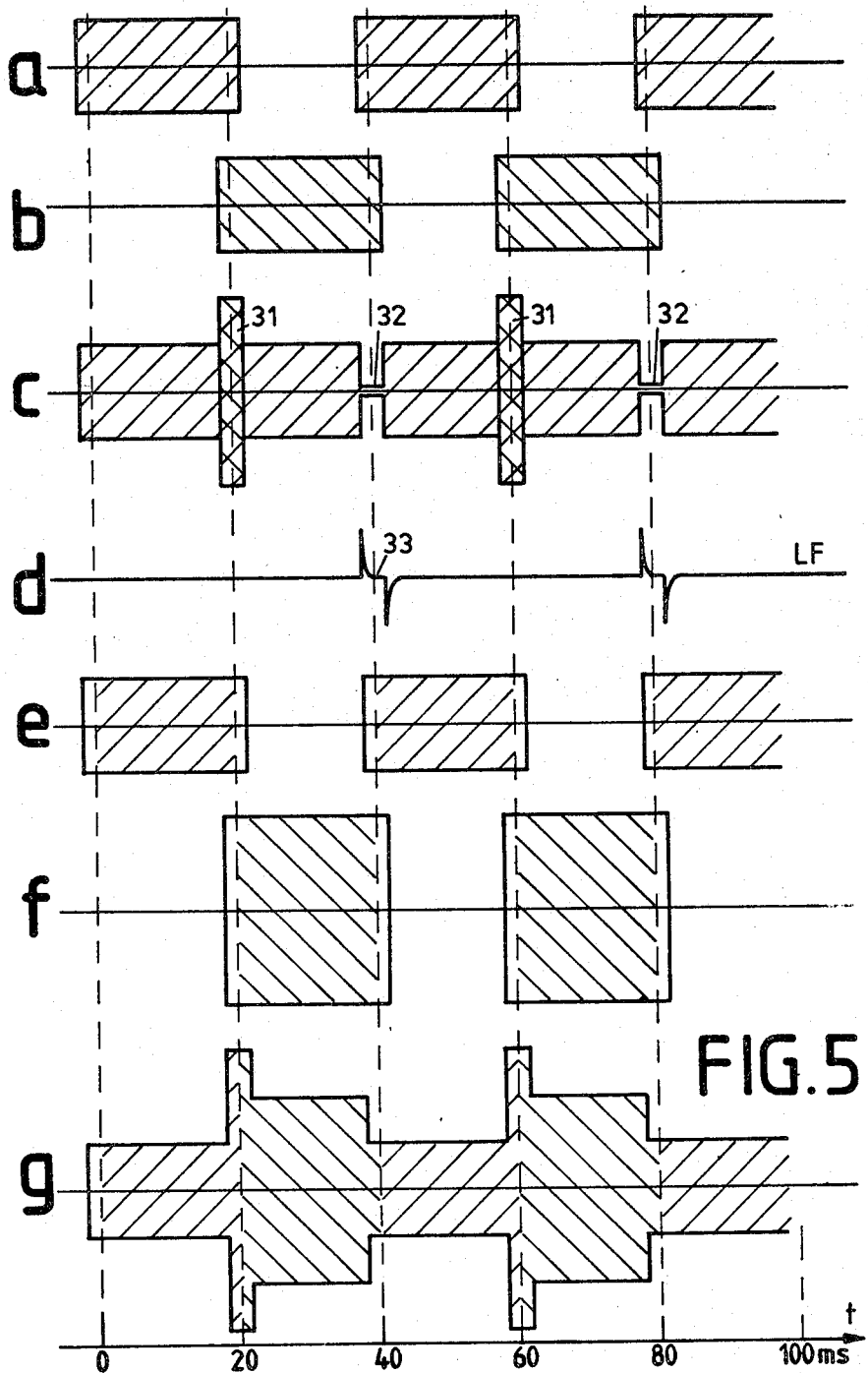
FIGS. 5(a)-(g) are detail diagrams of the signals occurring during playback according to the invention in the audio signal path.

FIGS. 5(a) to 5(g) show the time patterns of the signals from the heads with respect to audio signal processing. These Figures show the following:

FIG. 5(a): The audio carrier signal packets from head 14a;

FIG. 5(b): The audio carrier signal packets from head 14b;

FIG. 5(c): The sum of the signals of FIGS. 5(a) and (b), without the different amplification according to the invention. Periods 31 with signal increases and periods 32 with signal cancellations can be seen.

FIG. 5(d): Low frequency audio signal interference 33 at the output of the demodulator without amplification according to the invention and with an unmodulated carrier. Since FM demodulation is present, this interference does not have an annoying effect with augmented signals 31 which are limited, while it does have an annoying effect in connection with the signal cancellations 32 since the function of the demodulators is interrupted;

FIG. 5(e): As in FIG. 5(a), with use of the invention with no change being produced for this signal;

FIG. 5(f): The output signal from amplifier 26, having an amplification factor, for example, of 2; and FIG. 5(g): The output signal of the adder stage 25. It can be seen that the signal at all times has a finite, substantial amplitude which can be limited in such a manner that continuous interference-free demodulation becomes possible.

Figure 6:
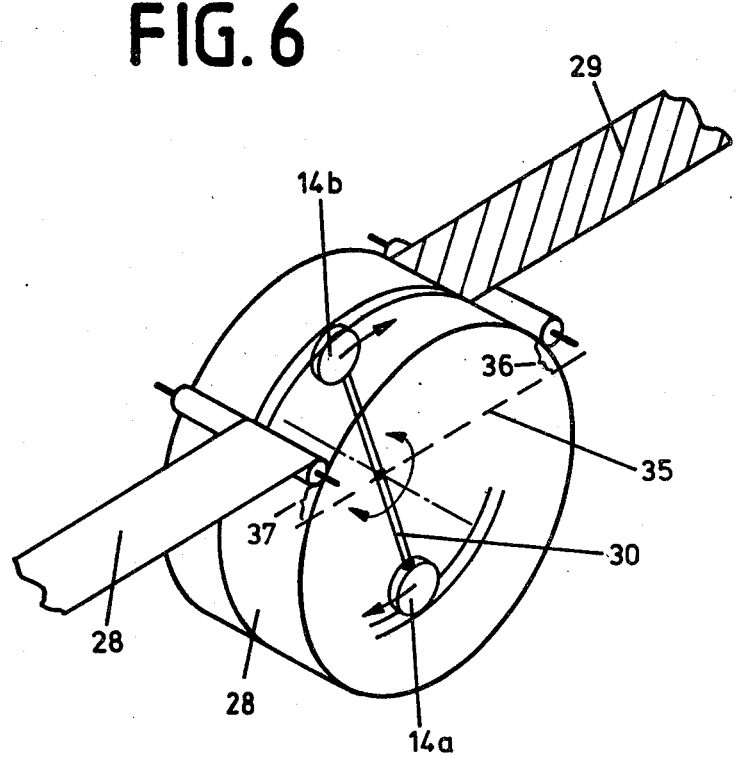
FIG. 6 is a schematic perspective view of the recording head structure of a recorder used in the practice of the invention.

FIG. 6 is a perspective representation of the structure of a head wheel with a tape 28 which encloses a head wheel drum. The wheel includes a carrier 30 supporting diametrically opposed two heads 14a, 14b. Tape 28 is wrapped around more than one-half the drum and thus assumes the form of an omega. Signals are recorded along oblique tracks 29 on the tape 28. As can be seen from the position of line 35 passing through the axis of rotation of the heads 14a, 14b, these heads will simultaneously scan tape portions at regions 36 and 37.

It will be understood that the above description of the present invention is susceptible to various modifications, changes and adaptations, and the same are intended to be comprehended within the meaning and range of equivalents of the appended claims.

What is claimed is:

1. In a video tape recorder for recording and/or playing back a picture carrier which has been angularly modulated with a video signal, the recorder including a rotating capstan drum having two electromagnetic transducer heads mounted to travel along oblique tracks on a magnetic tape and alternatingly scan the tape, both heads being active to scan the tape simultaneously in overlap zones along the drum, and means for additionally recording an audio signal, the improvement wherein said recording means comprise means for recording an audio carrier signal composed of an audio carrier which has been frequency modulated with the audio signal together with the video signal along the oblique tracks, and said recorder further comprises a playback system including: means defining a picture signal path and an audio signal path; signal separating means connected between said heads and said paths for conducting the picture carrier to said video signal path and the audio carrier signal to said audio signal path; and signal processing means connected to said audio signal path for additively superposing the audio carrier signal portions provided by both of said heads, before the audio carrier is demodulated, while causing the audio carrier signal portions provided by one said head to differ in amplitude from the audio carrier signal portions provided by the other said head in such a manner that in the superposed signal the signal portions provided by said one head always differ in amplitude from those provided by said other head.

2. Recorder as defined in claim 1 wherein the frequency of said audio carrier lies approximately at the maximum of the head/tape frequency response characteristic of said recorder.

3. Recorder as defined in claim 1 wherein the amplitude of said audio carrier is of the order of magnitude of 5 to 20% of the amplitude of said picture carrier.

4. Recorder as defined in claim 1 wherein the amplitude of said audio carrier is of the order of magnitude of 10% of the amplitude of said picture carrier.

5. Recorder as defined in claim 1 wherein the modulated picture carrier has a frequency spectrum which covers the frequency spectrum of said audio carrier signal, and further comprising picture carrier recording means including a filter for suppressing the frequency range corresponding to the frequency spectrum of said audio carrier signal from said modulated picture carrier prior to recording on the tape.

6. Recorder as defined in claim 1 wherein said recording means are arranged to record along the oblique tracks across the entire width of the tape, and said playback system operates to derive a synchronizing signal for marking the oblique tracks from signals on the oblique tracks themselves.

7. Recorder as defined in claim 1 wherein said signal processing means amplify the audio carrier signal portions provided by said one head to cause those portions to have approximately twice the amplitude of the signal portions provides by said other head before the signal portions provided by said two heads are superposed.

8. Recorder as defined in claim 1, 2, 3, 4, 5, 6 or 7 wherein said playback system conducts signals from said heads to said signal processing means without subjecting those signals to additional fade-out correction.

9. Recorder as defined in claim 1, 2, 3, 4, 5, 6 or 7 wherein said playback system further comprises means connected for producing a soft electronic fade-out with respect to the audio carrier signal contained in the output signal from said heads.

* * * * *